UNITED STATES PATENT OFFICE.

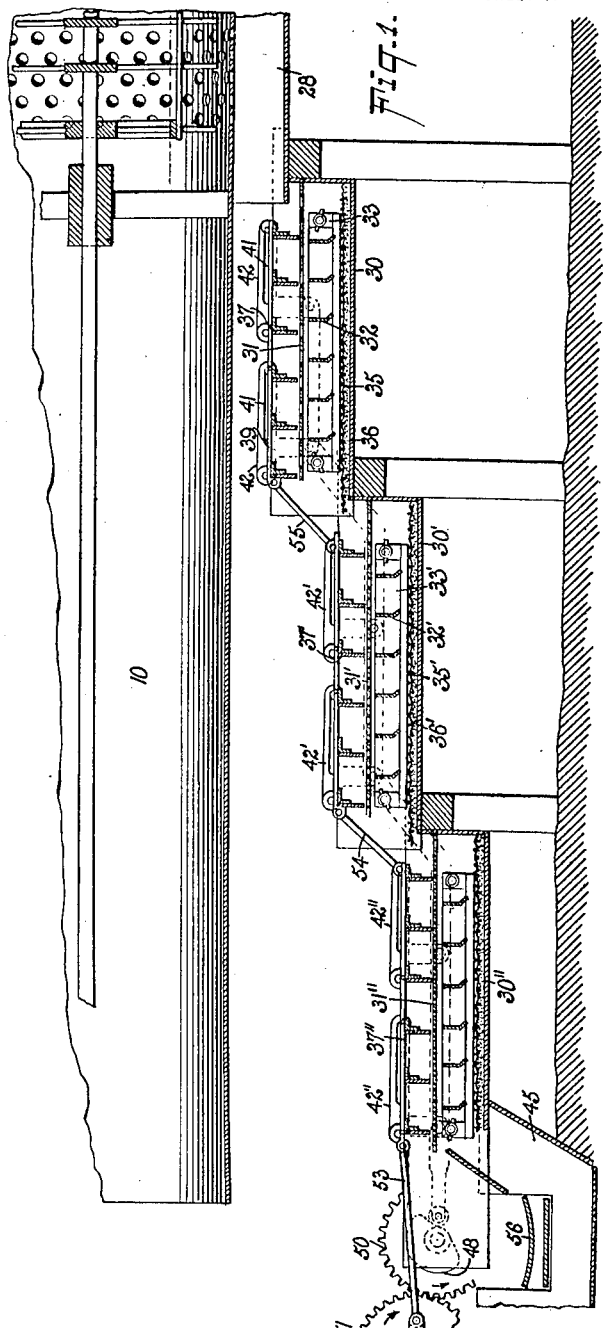

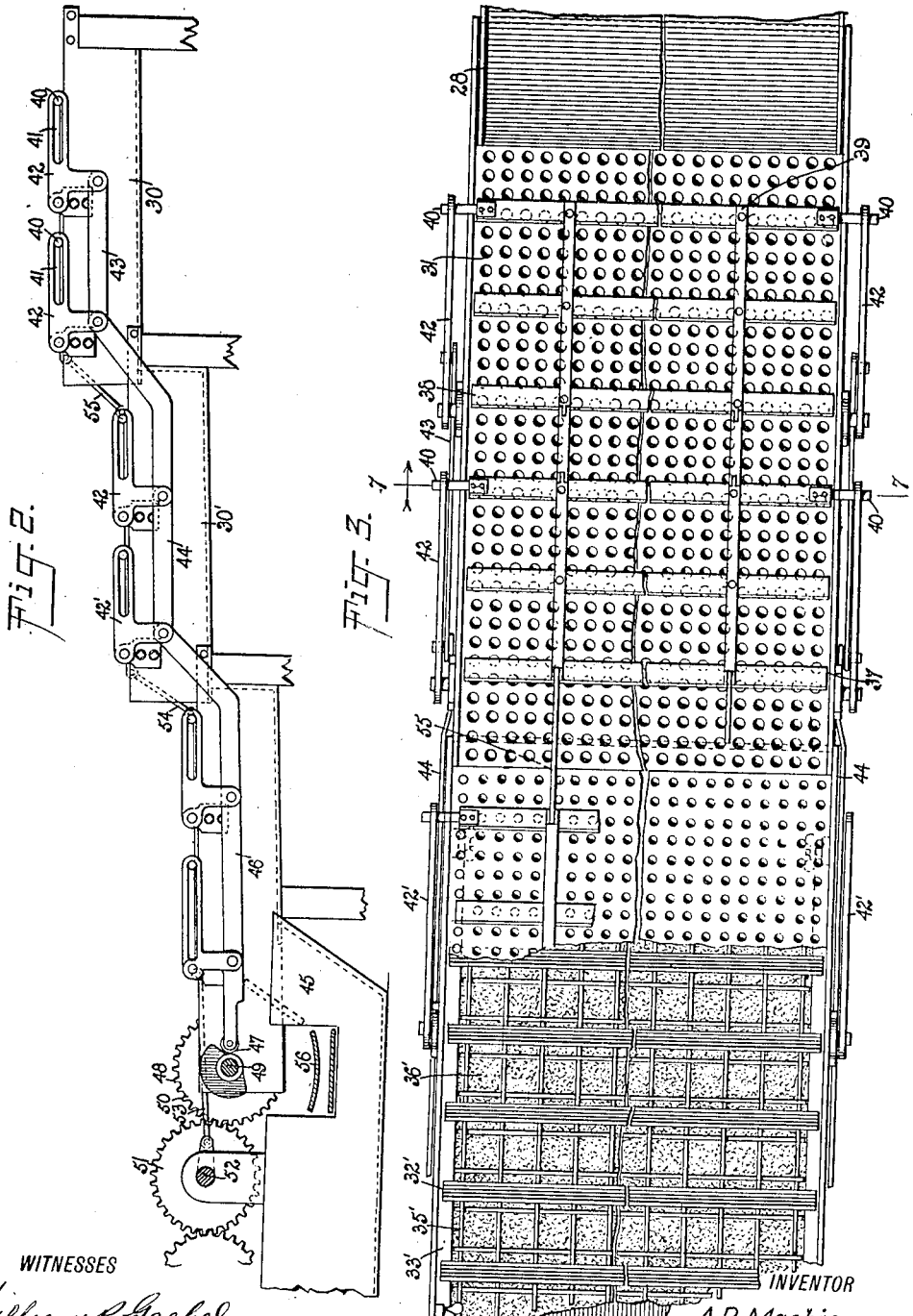

ALFRED R. MACKIE, OF LANDER, WYOMING.

GOLD-CONCENTRATOR.

1,286,185.  Specification of Letters Patent.  Patented Nov. 26, 1918.

Application filed July 19, 1917. Serial No. 181,502.

*To all whom it may concern:*

Be it known that I, ALFRED R. MACKIE, a citizen of the United States, and a resident of Lander, in the county of Fremont and State of Wyoming, have invented a new and Improved Gold-Concentrator, of which the following is a full, clear, and exact description.

My invention relates to concentrators for gold, and an object thereof is to provide a simple and efficient concentrator which will diminish manual labor to a minimum.

Another object of the invention is to provide a concentrator of the gravitational type in which movable rakes are provided for moving the material to be concentrated over grades and thereby facilitate and expedite the process of concentration.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a longitudinal section through a concentrator embodying my invention;

Fig. 2 is a side elevation of the mechanism for raising and reciprocating the rakes in the boxes;

Fig. 3 is a fragmentary plan elevation of the structure shown in Fig. 2, certain parts in said plan view being broken out to show the details of construction.

Referring to the drawings, 10 is a drum having perforations therein disposed above a box 28, which box slopes toward its delivery end, which is disposed above a box 30, also disposed to slope to the delivery end; in consequence, the tendency of the charge within the boxes is to travel toward the delivery end. The box 30 has a screen 31 spaced from the bottom and on to which screen the material from the box 28 falls. This screen also slopes toward the open or discharge end of the box 30 to facilitate the movement of the material on the screen toward the discharge end. Between the bottom of the box 30 and the screen 31 riffles 32 are accommodated. They are supported by a frame 33 within the box. The frame also retains on the bottom of the box a screen 35 and a mat 36, the screen resting on the mat and the mat resting on the bottom of the box.

The box 30 accommodates a rake 37 above the screen 31. The rake comprises a number of transverse bars 38 extending substantially across the entire width of the box. The transverse bars are interconnected by longitudinal bars 39 and thereby a unitary structure is formed. Trunnions 40 are provided on a pair of transverse bars. These trunnions bear on the side edges of the box and project beyond to enter slots 41 in the longer arms of bell-crank levers 42. The bell-crank levers are pivotally connected to the sides of the box near the junction of the two arms. The shorter arms of the bell-crank levers are interconnected by a link 43.

The box 30 discharges into a similar box 30′ sloping similarly and having a screen 31′ therein of a mesh smaller than the mesh of the screen 31 in the box 30. The box 30′ has also riffles 32′, the frame 33′ of which rests on a screen 35′, which screen anchors the mat 36′ to the bottom of the sluice box 30′. The rake 37′ above the screen 31′ is mounted on bell-crank levers 42′ in a manner similar as previously described. The short arms of said bell-crank levers 42′ are connected by a link 44 which extends to engage pivotally the link 43 of the bell-crank levers 42 on the box 30. The number of boxes may be varied according to the degree of classification desired. As shown, there are three sluice boxes, that is to say, the material from the box 30′ is delivered to a box 30″ from which it discharges into a tail race 45. The box 30″ is identical with the boxes 30 and 30′ except that the fabric 31″ thereof is of a finer mesh than the fabric 31′ of the box 30′. The bell-crank levers 42″ have the short arms thereof connected by a rod 46, a portion of which extends to join the rod 44 of the box 30′. It therefore will be noted that all of the bell-crank levers of the different rakes are interconnected and motion imparted to any of said bell-crank levers will be transmitted to the others by the rods connecting said levers.

Each of the rods 46 carries a roller 47 which bears against a cam 48 constrained to revolve with a shaft 49, with which shaft gears 50 are also constrained to revolve. The gears 50 are in mesh with gears 51 constrained to revolve with a crank shaft 52, the cranks of the shaft being connected by rods 53 to the rake 37'' of the box 30''. The rake 37'' is connected to the rake 37' by a link 54, and the rake 31' is connected to the rake 31 by a link 55.

As the crank shaft 52 moves in the direction of the arrow shown in Fig. 1 it drags all of the rakes in the boxes therewith toward the discharge end of the boxes. The length of the slots in the bell-crank levers is substantially equal to the throw of the crank shaft. When the rakes have reached the limit of their movement toward the discharge end of the boxes the cam 48 begins to move the rods 46 and therewith the rods 43 and 44. This movement of the rods causes the bell-crank levers to swing on their pivots, thereby raising the longer arms in which the slots are formed. The return movement of the crank begins to move the rakes toward the inlet end of the boxes, and in view of the rising of the bell-crank levers the rakes are moved up from the screens. As the limit of the return movement of the rakes is reached the cams 48 leave the rollers 47, that is, the longer arms of the bell-crank levers are brought down and the rakes are restored to their initial position on their respective screens. Thus it will be seen that during the return movement of the rakes they are clear from the screen, so as not to move the material upon the screen toward the inlet end.

The material remaining on the last screen, that is, on screen 31'', is raked off on to a conveyer 56 running transversely of the tail race 45 into which the material from the last mat is discharged.

The inclination of the boxes and screens therein is such that gravity and the flow of water are unable to disturb or carry off the valuable material present, but are able to feed and wash off the non-valuable materials, which are lighter than the particles containing the valuable material.

I claim:

1. In a gold concentrator, a box having an open end and mounted to slope toward the open end, a grading screen in the box above the bottom, a rake having trunnions, bell-crank levers the longer arms of which have elongated slots through which the trunnions project, means pivotally connecting said bell-crank levers to the sides of the box, means for moving the shorter arms of the bell-crank levers periodically whereby the longer arms are moved, and means for sliding said rake in the slots of the longer arms of the bell-crank levers.

2. In a gold concentrator, a plurality of boxes each open at one end and each disposed to slope toward the open end thereof, the preceding box being adapted to discharge into the succeeding one, a grading screen in each of the boxes above the bottom thereof sloping similarly to the bottom, a rake having trunnions and disposed in each box above the grading screen, bell-crank levers pivotally secured to the sides of each box, the longer arms of said bell-crank levers having elongated slots through which the trunnions of the rake project, means pivotally connecting the shorter arms of each box to the shorter arms of the other box, a cam for actuating one of said connecting means whereby said arms are oscillated, means for connecting pivotally the rakes of the adjacent boxes, a crank shaft, a connecting rod connecting the crank shaft to the proximate rake, and means gearing said cam and crank shaft so that all of said rakes are caused to move rearwardly when said bell-crank levers are oscillated.

3. In a gold concentrator, a series of screens disposed in stepped relation, a rake over each screen, slotted guides for each rake, means for raising said slotted guides when the rakes are retracted, and means for simultaneously reciprocating said rakes.

ALFRED R. MACKIE.

Copies of this patent may be obtained for five cents each, by addressing the "Commissioner of Patents, Washington, D. C."